E0152 XR 3,142,064

July 21, 1964 J. W. HUGHES ETAL 3,142,064

PIN PLUG ADAPTER FOR COUPLING TO RADIO SIGNAL IN POWER WIRING

Filed Nov. 15, 1960

INVENTORS
James W. Hughes
Nathan J. Stowell
BY [signature]
ATTORNEY

United States Patent Office 3,142,064

Patented July 21, 1964

3,142,064

PIN PLUG ADAPTER FOR COUPLING TO RADIO SIGNAL IN POWER WIRING

James Willis Hughes, P.O. Box 1713, Jackson, Miss., and Nathan J. Stowell, Jackson, Miss.; said Stowell assignor to said Hughes Filed Nov. 15, 1960, Ser. No. 69,396
5 Claims. (Cl. 343—720)

This invention relates to new and useful improvements in radio receiver antenna systems, and more particularly to a system for use with television receivers which utilizes existing electrical wiring of buildings, either internal, external or both, for picking up television signals to operate one or more television receivers located in such buildings.

Although the broad idea of utilizing electrical wiring as an antenna for television receivers is old in the art, previous antenna arrangements of this type have been seriously impaired by difficulties in properly balancing the system to minimize signal reflections in coordination with the polarity of the electrical circuit used for the antenna operation.

The principal object of the invention is to eliminate the above mentioned disadvantage of conventional antenna systems using electrical wiring for signal pick up purposes, and to provide improved antenna means whereby such electrical wiring may be utilized for signal pick up with more efficiency, dependability, safety and to a greater extent than in the past.

Another object of the invention is to provide an improved indoor antenna system which will eliminate the danger of the 60 cycle house current being applied to the receiver signal input circuit because of possible short circuiting of one of the low frequency house current blocking capacitors in the circuit.

Another object of the invention is to provide a resistive load across the receiver input circuit which will take the current load caused by high transient voltage and add protection to the receiver input circuit.

Another object of the invention is to provide a booster antenna for connection to a house wiring circuit which is used for collection and distribution of radio and television signal voltages when the house wiring circuit is inadequate to alone collect the necessary signal strength for satisfactory radio and television reception.

With the foregoing more important objects and features in view and such other objects and features as may become apparent as this specification proceeds, the invention will be understood from the following description taken in conjunction with the accompanying drawings, wherein like characters of reference are used to designate like parts, and wherein.

Figure 2:
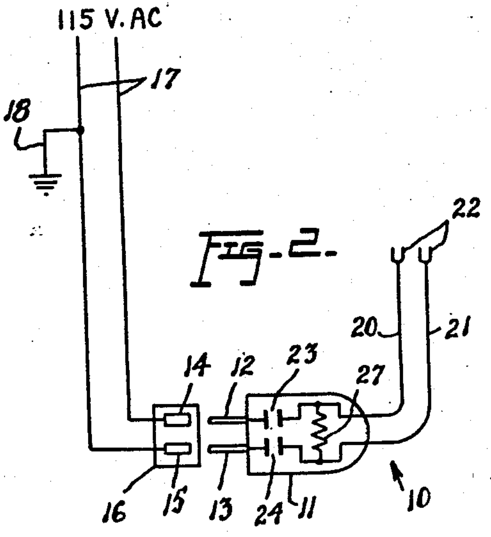
FIG. 2 is a wiring diagram of the device of FIG. 1 and of the electrical wiring with which it is used.
Figure 1:
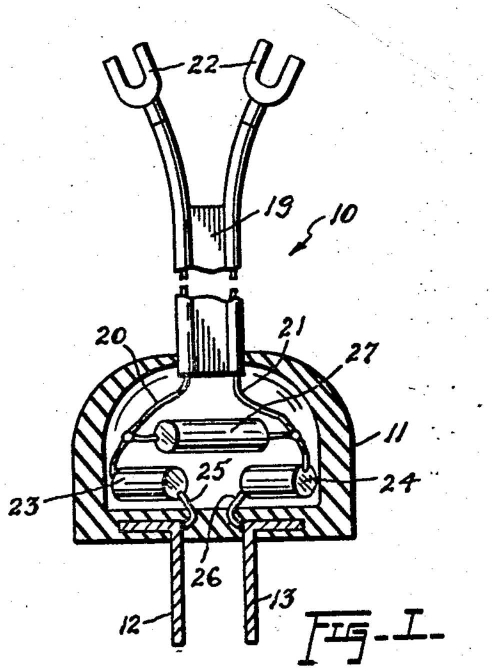
FIG. 1 is a sectional view of an antenna attachment plug, lead and electrical components embodied in the plug for television signal pick up by using existing electrical wiring of a building.

Referring now to the accompanying drawings in detail, more particularly to FIGS. 1 and 2, the reference numeral 10 generally designates a television receiver antenna device which embodies in its construction, inter alia, an attachment plug 11 having a pair of prongs 12, 13 which are separably engageable with and receivable in a pair of sockets 14, 15, respectively, of a conventional electrical outlet 16 in a building where a television receiver utilizing the antenna device 10 is used. As indicated in FIG. 1, the sockets 14, 15 of the outlet 16 are energized by a 115 volt alternating current supply 17 existing in the building, one side of the current supply being grounded in the conventional manner, as at 18. An antenna transmission line 19 extends from the plug 11, being in the usual form of a flat strip of insulating material with a pair of parallel conductors 20, 21 embedded in its longitudinal edges, the ends of the conductors 20, 21 at the end of the transmission line 19 remote from the plug 11 being equipped with suitable terminals 22 for connection to the television receiver. The inner ends of the conductors 20, 21 which enter the plug 11 are connected. respectively, to a pair of capacitors 23, 24 which in turn are connected as at 25, 26, respectively, to the prongs 12, 13. Thus, the capacitors 23, 24 are connected in series with the prongs 12, 13 to the television receiver, and a resistor 27 is connected across the conductors 20, 21, as will be clearly apparent. It is to be noted that the capacitors 23, 24 as well as the resistor 27 are disposed within the plug 11 so that, apart from the electrical wiring 17, the antenna device 10 is self-contained and does not utilize any electrical equipment between the television receiver and the plug 11 other than the transmission line 19 and also does not require any modification in the electrical arrangement of the television receiver itself.

For balancing the antenna system proper values of the component parts of my antenna system may be selected as follows:

Television receivers are conventionally considered to have an input impedance $Z_1$ of 300 ohms. To match this impedance the antenna transmission line 19 is conventional television antenna wire having an impedance $Z_2$ of 300 ohms. The resistor 27 is then selected to have a resistance value R of 300 ohms in order that the load impedance of the input circuit may be balanced.

Capacitors 23 and 24 and resistor 27 effectively form a series circuit with the house wiring system which collects the radio and television signals. The impedance of each of capacitors 23 and 24 is selected to be one-half of the 300 ohm load. Therefore the resistive impedance $Xc_1$ and $Xc_2$ of capacitors 23 and 24, respectively, may be inserted in the following formulas to find the proper value of capacitance $C_1$ and $C_2$ in microfarads of the capacitors 23 and 24, respectively:

$$Xc_1=\frac{10^6}{2\Pi FC_{1/2}}=150 \text{ ohms}$$

$$Xc_2=\frac{10^6}{2\Pi FC_{2/2}}=150 \text{ ohms}$$

The value of frequency F which is inserted in the above formula is the lowest frequency selectable for the particular receiver.

Using the values and equations given above, circuit elements of my antenna system can be chosen to provide a properly balanced input antenna system, irrespective of the ground connection in the house circuit. There will be no danger of burning out the input coils of the coupling transformer in the receiving set as the impedance of properly chosen capacitors 23 and 24 will be in megohms for the 60 cycle per second house current. Capacitors 23 and 24 provide a low impedance path for the radio frequency voltage.

Using the complete balanced input antenna system both capacitors 23 and 24 must be shorted before the input transformer coil of the set could be damaged.

Figure 3:
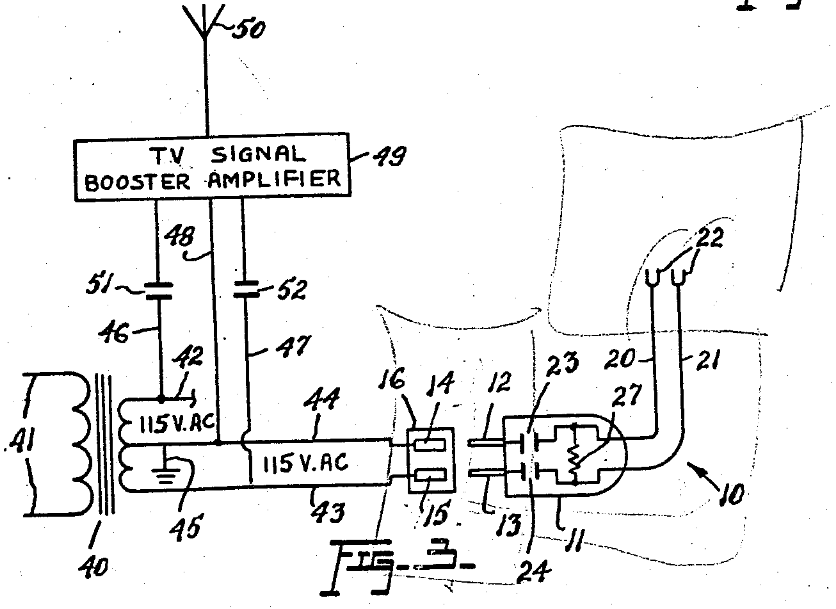
FIG. 3 is a wiring diagram showing a modified arrangement of the antenna system.

The modified antenna system shown diagrammatically in FIG. 3 also utilizes the antenna device 10 constructed as already described, but in conjunction with a building wiring circuit wherein a secondary alternating current transformer 40 is located within the confines of the building and is not accessible to a television transmitter signal. As such, the transformer 40 receives its current supply from an external power line 41 and the secondary winding of the transformer feeds two 115 volt alternating current lines 42, 43 having a common leg 44 which is grounded as at 45 in the conventional manner. One of the lines, for example the line 43 and the grounded line or leg 44, is connected to the outlet 16 as shown, and connections are taken from the lines 42, 43, 44 by conductors 46, 47, 48, respectively, to a television signal booster amplifier 49 which is equipped with an outside television antenna 50. The conductors 46 and 47 are provided with 115 volt, 60 c.p.s. decoupling capacitors 51, 53, respectively, as shown. The other line 42 and grounded line 44 may be similarly connected.

The modified antenna system is particularly useful in an apartment house where a plurality of television receivers are to be used and a separate antenna for each receiver is undesirable. The house wiring system is utilized by my modified antenna system to distribute the television signal voltage collected by a single antenna to the plural receivers.

While in the foregoing there have been described and shown the preferred embodiments of the invention, various modifications may become apparent to those skilled in the art to which the invention relates. Accordingly, it is not desired to limit the invention to this disclosure and various modifications may be resorted to, falling within the spirit and scope of the invention as claimed.

What is claimed as new is:

1. A balanced television antenna device for use in conjunction with an electrical circuit of a building having an outlet receptacle, said device consisting solely of an attachment plug separably connected to said receptacle, said plug having a pair of prongs in electrical engagement with said circuit, an antenna transmission line extending from said plug to a television receiver and including a pair of parallel spaced, insulated conductors, said antenna transmission line having an impedance value matching the input impedance value of the television receiver to which it extends; and a pair of fixed and substantially equal value capacitors contained within said plug and connected in series with the respective conductors of said antenna transmission line to the respective prongs of the plug, and a fixed value resistor contained within said plug and connected across said conductors to said capacitors, said fixed resistor having an impedance value matching the television receiver input impedance.

2. The combination of an electrical circuit of a building having an outlet receptacle with a pair of sockets energized by said circuit, and a balanced television antenna device consisting solely of an attachment plug having a pair of prongs in separable electrical engagement with the respective sockets of said outlet receptacle, an antenna transmission line extending from said plug to a television receiver and including a pair of parallel spaced, insulated conductors, said antenna transmission line having an impedance value matching the input impedance of the television receiver to which it extends, a pair of fixed and substantially equal value capacitors contained within said plug and connected in series with the respective conductors of the antenna transmission line to the respective prongs, and a fixed value resistor contained within the plug and connected across said conductors to said capacitors, said fixed resistor having an impedance value matching the television receiver input impedance.

3. The combination as defined in claim 2 together with an outside television antenna connected to said electrical circuit.

4. The combination as defined in claim 2 together with an outside television antenna connected to said electrical circuit, and a television signal booster amplifier interposed between said outside antenna and said circuit.

5. The combination as defined in claim 4 together with capacitors interposed between said circuit and said booster amplifier.

References Cited in the file of this patent

UNITED STATES PATENTS

| | | |
|---|---|---|
| 1,578,288 | Hough | Mar. 30, 1926 |
| 1,717,701 | Dubilier | June 18, 1929 |
| 1,861,183 | Hough | May 31, 1932 |
| 2,562,654 | Williams | July 31, 1951 |
| 2,925,598 | Williams | Feb. 16, 1960 |